Dec. 30, 1969   B. E. GORDON, JR   3,486,733
SEAT RING FOR BALL VALVES
Filed Sept. 1, 1967   2 Sheets-Sheet 1
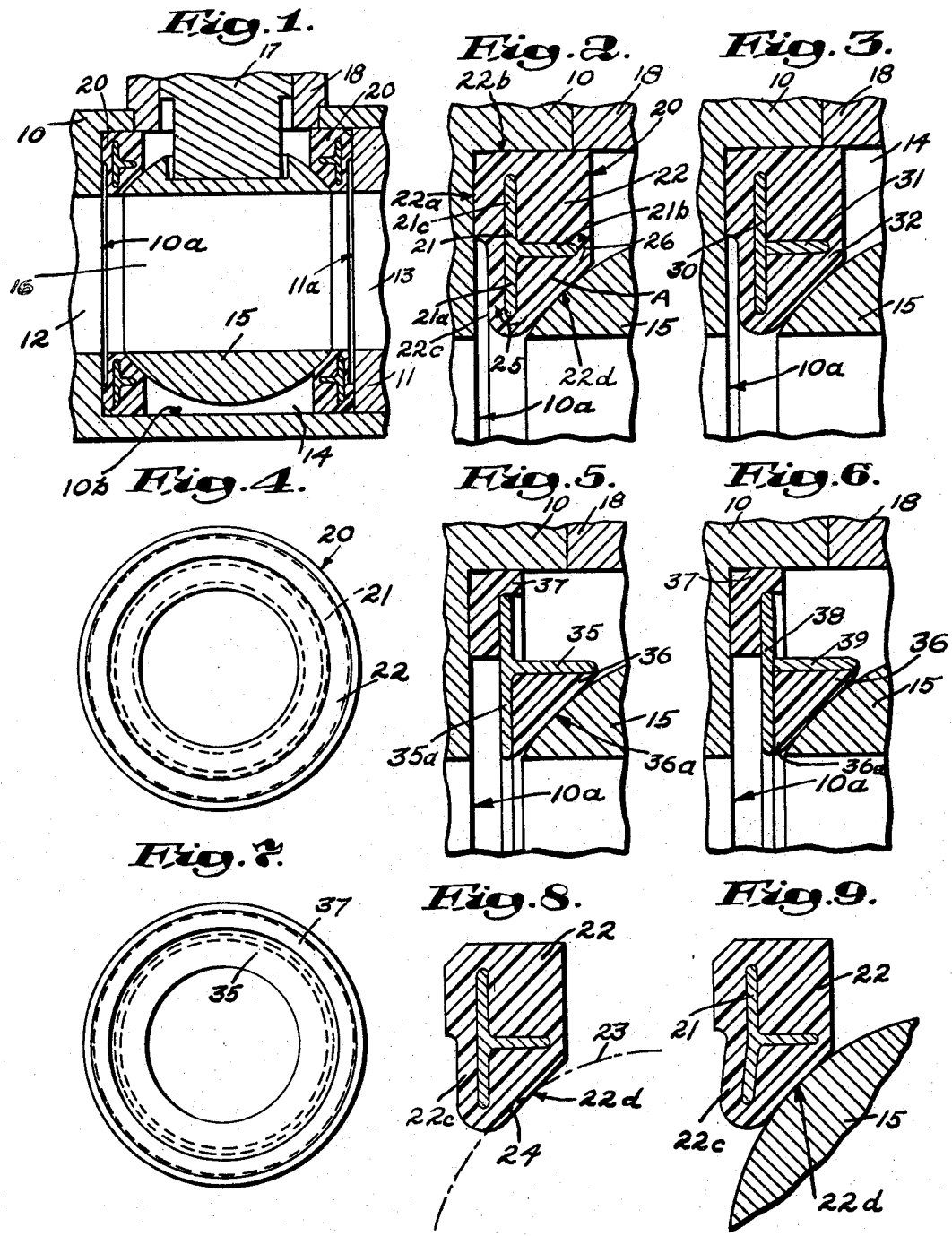
Inventor:
Bennett E. Gordon, Jr.
by Thomson & Mrose
Attorneys Dec. 30, 1969  B. E. GORDON, JR  3,486,733
SEAT RING FOR BALL VALVES
Filed Sept. 1, 1967  2 Sheets-Sheet 2
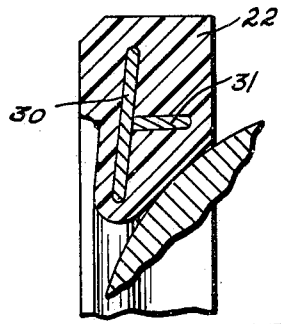
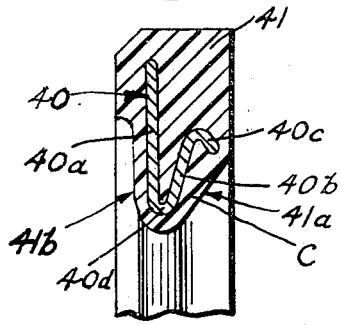
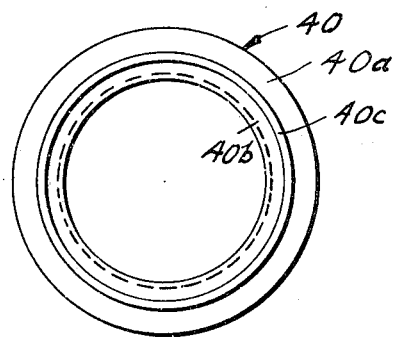
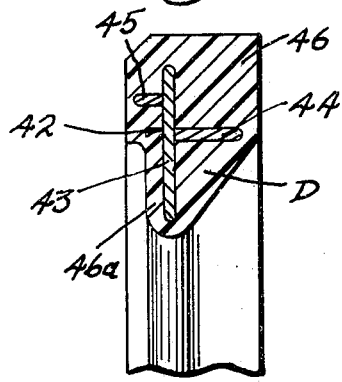
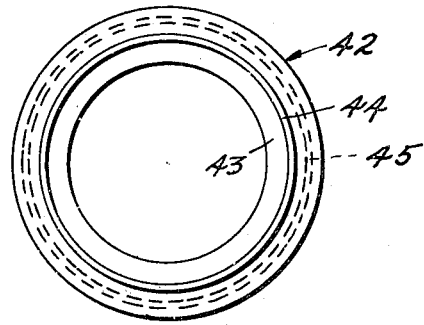
Inventor:
Bennett E. Gordon, Jr.
by Thomson & Mrose
Attorneys

United States Patent Office 3,486,733
Patented Dec. 30, 1969

3,486,733
SEAT RING FOR BALL VALVES
Bennett E. Gordon, Jr., Auburn, Mass., assignor to Jamesbury Corp., Worcester, Mass., a corporation of Massachusetts
Filed Sept. 1, 1967, Ser. No. 665,212
Int. Cl. F16k 25/00, 5/00
U.S. Cl. 251—172        5 Claims

ABSTRACT OF THE DISCLOSURE

A composite seat ring consisting of a core of resilient material and sealing portions of plastic or other material. The core is substantially T-shaped and has branches confining the sealing material in the region of engagement of the seat by the ball to restrain cold flow and shrinkage. In one form the core is completely encapsulated in the sealing material. In another form the core supports two separate ring-shaped segments which seal against the ball and the valve casing.

BACKGROUND OF THE INVENTION

This invention relates to seat rings for ball valves, and more particularly to seat rings of the type shown in Patent 2,945,666 having a flexible inner lip which engages the ball and is free to bend in the axial direction of the ring under the load resulting from fluid pressure on the ball.

SUMMARY

The principal object of this invention is to provide a seat ring construction which extends the range of temperature and load conditions under which many types of sealing materials can be used, and which minimizes cold flow in plastic materials.

The seat ring here disclosed consists in general of a core, made of metal or similar resilient material of high tensile strength supporting inner and outer ring portions of sealing material. The inner ring portion has an oblique inner surface which engages the ball and the outer ring portion seals against the interior of the valve casing. The core is substantially T-shaped, and includes a radial disk portion extending into the inner and outer ring portions, and an annular portion extending axially from the disk between the two ring portions. The inner periphery of the disk and the free end of the annulus closely approach the inner and outer boundaries of the oblique surface, respectively. In one form of seat ring, the core is wholly encapsulated in the seal material, and in another form, separate inner and outer ring segments are supported on the core. The core itself may be formed in one piece, or two or more separate pieces. Other objects, advantages, and novel features will be apparent from the following detailed description.

BRIEF DESCRIPTION OF THE DRAWINGS

In the drawings illustrating the invention:

FIGURE 1 is a cross-section, with the housing partly broken away, of an assembled ball valve equipped with seat rings constructed according to the invention;

FIGURE 2 is an enlarged fragmentary cross-section taken in the region of one of the seat rings;

FIGURE 3 is a fragmentary cross-section similar to FIGURE 2 showing a modification of the core of the seat ring;

FIGURE 4 is an end view of one of the seat rings shown in FIGURE 1;

FIGURE 5 is a fragmentary cross-section similar to FIGURE 2 illustrating a modified form of seat ring;

FIGURE 6 is a cross-section similar to FIGURE 5 illustrating a modified form of core;

FIGURE 7 is an end view, on a reduced scale, of one of the seat rings shown in FIGURES 5 and 6;

FIGURES 8 and 9 are schematic illustrations showing the relationship of the seat ring cross-section to the ball radius before and after assembly;

FIGURE 10 is a fragmentary cross-section illustrating schematically one manner of bending of the core under load;

FIGURE 11 is a fragmentary cross-section of a seal, illustrating another modified form of core;

FIGURE 12 is an end view, on a reduced scale, of the core of the seat ring shown in FIGURE 11;

FIGURE 13 is a fragmentary cross-section of seal, illustrating still another modified form of core; and FIGURE 14 is an end view, on a reduced scale, of the core of the seat ring shown in FIGURE 13.

DESCRIPTION OF THE PREFERRED EMBODIMENTS

A typical ball valve in which the seats here disclosed are used has a housing, which may be of any suitable construction, here illustrated as composed of two sections 10 and 11. The sections have fluid passages 12 and 13 and define a cylindrical valve chamber 14 with end walls 10a and 11a. A ball 15 is disposed in the chamber 14 and has a through passage 16. The ball is connected to a stem 17 by which the ball can be turned through 90° from an open position, in which the passage 16 is aligned with passages 12 and 13, and a closed position in which the ball blocks flow through the valve. The stem is housed in a bonnet 18 which may be of any suitable construction.

Seat rings, generally indicated by the numeral 20, which are the same in construction but face in opposite directions, are disposed around passages 12 and 13 on opposite sides of the ball. The rings serve as seals between the ball and the housing. It is understood that a single seat ring of the type here shown may be used and the ball may be restrained on the opposite side by other means.

The seat 20 as shown in FIGURE 2 has a thin one piece core 21 of T-shaped cross-section, made of a resilient material which is not subject to cold flow, such as metal. The branches 21a and 21c of the core are aligned substantially in the radial direction of the ring, and comprise a flat annular disk. The branch 21b is a tubular annulus which extends in the axial direction. The core is fully encased in a molded body 22, having an end surface 22a, which bears against the end wall 10a of the valve chamber, and an outer surface 22b, which engages the side wall 10b of the chamber.

The inner part of the seat body 22 is cut away, on the the side next to wall 10a to form a lip 22c having a bearing surface 22d which engages the ball 15. As initially manufactured surface 22d is substantially conical, and the longitudinal dimension of the valve chamber, from wall 10a to wall 11a is designed to be somewhat less than the overall longitudinal dimension of the ball and seat ring assembly. A certain amount of pre-loading of the lips is thrust produced when the ball and seat rings are assembled in the housing. In FIGURE 8 the seat ring is shown in its unstressed shape, and the dot and dash line 23 illustrates the relative position the ball will assume when the valve is assembled. The interference between the ball and the lip lies principally in the region 24 toward the inner edge of the lip. When the ball and ring are assembled, as illustrated in FIGURE 9, the lip 22c bends, and the ball bears more nearly on the center of surface 22d. After the valve has been in service for a short time, the surface 22d may conform substantially to the contour of the ball. FIGURES 8 and 9 are somewhat exaggerated for clarity. The amount of interference and initial bending of the lip is usually in the order of .01 to .1 inch. In operation, the lip of the downstream seat bends in the downstream direction when the valve is closed and fluid pressure is applied to the ball.

The ring body may be made of rubber of various degrees of hardness, rigid materials such as ceramic or graphite, or of any of the synthetic plastic materials commonly used for valve seats, such as tetrafluoroethylene. In the form of ring just described, branches 21a and 21b, and surface 22d define an inner ring portion A, of generally triangular cross-section, while the remainder of the body is the outer ring portion. Cold flow of plastic material in portion A, where the ball load is imposed, is restrained by the close approach of the inner periphery of the disk 21a and the free end of the annulus 21b to the surface 22d and can take place only along the restricted paths around the ends of those branches as indicated by the arrows 25 and 26. The thickness of plastic material in the regions of paths 25 and 26 is exaggerated in the drawings for clarity, and is in the order of .02 to .08 inch. Cold flow of the plastic in the load bearing inner ring portion A is thus minimized.

The resilient core enables the seat as a whole to withstand a higher load than an all plastic seat of similar configuration and material and insures full recovery of the seat. The force applied between the ball and seat by the initial pre-loading is thus maintained so that an effective seal is maintained even at low pressures. The core also limits shrinkage of the plastic parts of the seat under cryogenic conditions.

The seat ring illustrated in FIGURE 3 consists of a core made up of two separate sections, a flat disk section 30, and an annulus section 31, encapsulated in a plastic body 32. This seat ring functions in essentially the same way as that shown in FIGURE 2. Its chief advantage over the first form is that the core is easier to fabricate. Section 30 is made of resilient material and acts as spring. Section 31 may be made of rigid, non-resilient material.

The seat ring shown in FIGURE 5 has a one piece metal core 35 of T-shaped cross-section supporting separate inner and outer ring segments 36 and 37. Segment 36 is of generally triangular cross-section and has a ball engaging surface 36a. The outer segment 37 engages the walls of the valve chamber. Branch 35a of the core is spaced from the casing and is bendable in the axial direction of the ring under pressure applied to segment 36. This branch and segment 36 together act as a flexible lip seal.

The segments 36 and 37 may be cemented to the core, but this is not essential as the parts of the seat ring, when assembled into the valve, are held in place by the ball and casing.

The seat ring shown in FIGURE 6 is essentially the same as that shown in FIGURE 5, but has two piece core made up of a flat disk section 38 and a tubular annulus section 39. The same segments 36 and 37 are used with the two piece core and may or may not be cemented to it.

In the form of seat ring shown in FIGURES 5 and 6, the segments may be made of any material normally used for valve seats. This construction is particularly advantageous, however, when it is desirable to make the segments, which form the sealing surfaces, of non-resilient or brittle material, or materials which are difficult to mold, for example, carbon or asbestos which are especially suitable for high temperature applications.

FIGURES 5 and 6 illustrate another feature of the seat. The inner branch 35a, or the flat section 38 as the case may be, extends substantially to the inner rim 36a of the segment 36. This inner rim is very narrow. When the ball is turned the inner edge of the metal core scrapes off any material adhering to the ball surface and tends to keep the surface of the ball clean and free of particles which might cause faulty sealing.

FIGURE 10 illustrates another mode of bending of the core which may occur under load, especially in the case of a two piece core. Here the flat ring section 30 rocks as a whole about its center. The movement is very slight and is exaggerated in the drawing. In most cases the deflection of the core under load is a combination of this mode of bending and that illustrated in FIG. 9.

FIGURE 11 illustrates a core which may be made, for example, of spun metal. The core, generally indicated by the numeral 40 has a flat disk comprising a branch 40a and an annulus comprising a branch 40b extending obliquely toward the outer part of the ring, and a branch 40c extending obliquely toward the ball. The core is encapsulated in a seat body generally indicated by the numeral 41, which has a substantially conical bearing surface 41a, and a conical surface 41b on the side away from the ball. The portion of the seat ring between these two surfaces constitutes a flexible lip. Branches 40b and 40c of the core define, with surface 41a, a generally triangular bearing region C. The body material is very thin around the junction 40d of branches 40a and 40b, and around the end of branch 40c, so that flow of material in region C is effectively restricted, as in the seat rings previously described.

In the seat ring illustrated in FIG. 13, the core, generally illustrated by the numeral 42 is made up of a flat disk section 43 and two tubular sections 44 and 45, disposed on opposite sides of section 43. The core is encapsulated in a plastic body 46 having an inner lip portion 46a into which section 43 extends. The inner end of section 43 and the end of section 44 are close to the surface and these sections bound a generally triangular inner ring portion D on which the ball bears. These sections restrain cold flow in the bearing area in the same manner as sections 30 and 31 in the seat ring of FIG. 3, for example.

The section 45 in the seat ring of FIG. 13 provides a safety feature, in case the plastic portion of the ring is destroyed by fire. In that case, the ball will bear on sections 43 and 44, and section 45 will bear on the casing. The seal will continue to function well enough to prevent the escape of any substantial amount of fluid through the valve.

In all forms of seat here shown, the metal core provides the principal bending resistance, and the sealing material itself is subjected principally to compressive load. The usable load and temperature range of low tensile strength sealing materials, and materials which lose tensile strength at high temperatures, is thus considerably extended. This construction is, also, suitable for sealing materials which become brittle at cryogenic temperatures.

The resilient core insures full recovery of the seat as a whole to its normal shape when the pressure is relieved so that no permanent deformation occurs and contact between the ball and the seat is maintained.

Although the seat rings are here illustrated as used with a full ball plug, it is understood that they may be used with half ball and skeleton ball closures, or any type of rotary plug having a spherical sealing surface.

What is claimed is:

1. In a ball valve of the type having a casing enclosing a valve chamber and provided with fluid passages communicating with said chamber and a ball closure member mounted in said chamber: the combination comprising a seat ring surrounding one of said passages and comprising a resilient core and inner and outer ring portions of sealing material, said inner ring portion having an oblique surface engaged with said ball; said core comprising an annular disk extending radially with respect to said seat ring into said inner and outer ring portions, and an annulus joined at one axial end thereof to said disk and extending between said inner and outer ring portions with an axial component of direction to a free axial end having a radius intermediate the radii of the inner and outer peripheries of said disk; said disk and said annulus confining said inner ring portion of sealing material, the inner periphery of said disk and the free end of said annulus closely approaching said oblique surface of said inner ring portion adjacent opposite ends thereof; said inner ring portion and said disk comprising a seal lip bendable axially of said ring.

2. A seat ring as recited in claim 1, said core being of T-shaped crossed-section.

3. A seat ring as recited in claim 1, said annulus extending from said one axial end with a radially-outward component and thence with a radially-inward component toward said free end.

4. A seat ring as recited in claim 1, said core including a further annulus joined at one axial end thereof to said disk on a side thereof opposite to said first-mentioned annulus.

5. A seat ring as recited in claim 4, said further annulus being spaced radially outwardly of said free end of said first mentioned annulus.

References Cited

UNITED STATES PATENTS

| | | | |
|---|---|---|---|
| 2,297,161 | 9/1942 | Newton | 251—315 |
| 2,373,628 | 4/1945 | Gleeson | 251—315 |
| 3,014,690 | 12/1961 | Boteler | 251—315 X |
| 3,272,472 | 9/1966 | Goldman | 251—309 X |
| 3,356,337 | 12/1967 | Olen | 251—315 |
| 3,380,706 | 4/1968 | Scaramucci | 251—317 X |
| 3,401,914 | 9/1968 | Shand | 251—172 |
| 3,394,915 | 7/1968 | Gachot | 251—315 X |

FOREIGN PATENTS 978,601  12/1964  Great Britain.

M. CARY NELSON, Primary Examiner

M. O. STURM, Assistant Examiner

U.S. Cl. X.R.

251—315